(12) United States Patent  
Orfield

(10) Patent No.: US 9,879,842 B2  
(45) Date of Patent: Jan. 30, 2018

(54) SUNNY BRIGHT SOLAR LIGHTING

(71) Applicant: Loyd Edward Orfield, Colorado Springs, CO (US)

(72) Inventor: Loyd Edward Orfield, Colorado Springs, CO (US)

(*) Notice: Subject to any disclaimer, the term of this patent is extended or adjusted under 35 U.S.C. 154(b) by 336 days.

(21) Appl. No.: 14/747,754

(22) Filed: Jun. 23, 2015

(65) Prior Publication Data

US 2015/0354785 A1 Dec. 10, 2015

Related U.S. Application Data

(63) Continuation-in-part of application No. 13/770,346, filed on Feb. 19, 2013.

(51) Int. Cl.
| | |
|---|---|
| *F21V 5/00* | (2015.01) |
| *F21V 13/02* | (2006.01) |
| *F21V 8/00* | (2006.01) |
| *F21S 19/00* | (2006.01) |
| F21S 11/00 | (2006.01) |
| F21Y 115/10 | (2016.01) |

(52) U.S. Cl.
CPC .......... *F21V 13/02* (2013.01); *F21S 19/005* (2013.01); *G02B 6/0005* (2013.01); *F21S 11/002* (2013.01); *F21S 11/007* (2013.01); *F21Y 2115/10* (2016.08)

(58) Field of Classification Search
CPC ........ F21S 11/00; F21S 11/002; F21S 19/005; F21S 11/007; F21S 11/005; F21S 19/00; F21V 13/02

USPC ............................................ 359/853; 126/698
See application file for complete search history.

(56) References Cited

U.S. PATENT DOCUMENTS

| 4,152,752 A * | 5/1979 | Niemi ...................... F21S 2/00 |
| | | 362/145 |
| 5,581,447 A * | 12/1996 | Raasakka ................. F21S 11/00 |
| | | 126/698 |
| 6,037,535 A * | 3/2000 | Yoshino .................. A01G 9/243 |
| | | 126/605 |
| 6,299,317 B1* | 10/2001 | Gorthala .................. F21S 11/00 |
| | | 359/591 |

(Continued)

*Primary Examiner* — Bryon T Gyllstrom  
*Assistant Examiner* — James Endo  
(74) *Attorney, Agent, or Firm* — Hanes & Bartels LLC

(57) ABSTRACT

Sunny Bright Solar Lighting is an easily mounted roof solar sunpipe that magnifies and concentrates the incoming sun light with an internally mounted and focused nonimaging Fresnel lens paired with a Kohler concentrator lens in order to magnify and concentrate the focused intense sun light onto a fiber optic illumination systems glass plate, used for solid core fiber optic lighting cables, and a bundle of seven 14 mm solid core endglow plastic fiber optic cables that carries only light waves in a visible light spectrum to seven different rooms that are up to thirty three feet away from the roof mounted sunny bright solar tube. Each fiber optic cable has an easily installed adjustable light aperture with diffuser on the end in order to dim or turn off each light independently this would allow sunny bright solar lighting to bring the suns light into any desired room during the day and at night the 110 v LED lighting array that is internally mounted in the sunny bright solar tube would replace the sunlight to continue lighting the seven different rooms.

5 Claims, 4 Drawing Sheets

(56) References Cited

U.S. PATENT DOCUMENTS

| | | | |
|---|---|---|---|
| 6,730,840 B2* | 5/2004 | Sasaoka | F24J 2/067 136/246 |
| 2003/0147261 A1* | 8/2003 | Babbitt | F21S 11/00 362/582 |
| 2005/0224074 A1* | 10/2005 | Steneby | F21S 11/00 126/698 |
| 2006/0245184 A1* | 11/2006 | Galli | F21L 4/005 362/208 |
| 2008/0019657 A1* | 1/2008 | Maitland | G02B 6/0008 385/140 |
| 2009/0021934 A1* | 1/2009 | Chu | F21S 11/00 362/241 |
| 2010/0123954 A1* | 5/2010 | Benitez | F24J 2/085 359/626 |
| 2011/0103088 A1* | 5/2011 | Wemmer | F21S 11/00 362/555 |
| 2011/0226311 A1* | 9/2011 | Sun | F21S 11/002 136/247 |

* cited by examiner

SUNNY BRIGHT SOLAR LIGHTING

This application is a continuation-in-part application of the application entitled Sunny Bright Solar Lighting, Ser. No. 13/770,346, filed Feb. 19, 2013.

BACKGROUND

The present invention relates to fiber optics illumination systems having a primary solar light source.

Transmitting solar light from a building skylight in the roof by fiber optical cable is shown in published patent application No. 2011/0103088.

U.S. Pat. No. 5,581,447 to Raasakka for Solar Skylight Apparatus discloses a pivotal collector that follows the movement of the sun and which contains a plurality of Fresnel lenses each of which transmits solar light to a fiber optic bundle that terminates in a light dispersion unit to light a room in the building.

While the Fresnel lenses of Raasakka focus the light into bundles of fiber optic cables the light is not magnified or concentrated. Published patent application No. 2010/0123954 by Benitez et al. discloses a Fresnel lens in combination with a Kohler integrator to concentrate sunlight onto a photovoltaic cell.

The object of the present invention is to utilize the magnification and concentration properties of a Kohler integrator to enhance the degree of sunlight that passes through the prior art bundle of fiber optic cables that carry light from a Fresnel lens.

SUMMARY OF THE INVENTION

A roof mounted solar sun pipe transmits sunlight through a non-imaging Fresnel lens to a Kohler concentrator lens that magnifies and concentrates the focused intense sunlight into a fiber optic illumination system comprising a glass plate against which are mounted the light receiving ends of a plurality of fiber optic cables. The cables transmit the solar light to a like plurality of rooms in a building. A light diffuser is connected to the distal end of each cable for scattering the light into a lighting fixture that includes an adjustable aperture to dim or turn off the light.

DETAILED DESCRIPTION

Figure 1:
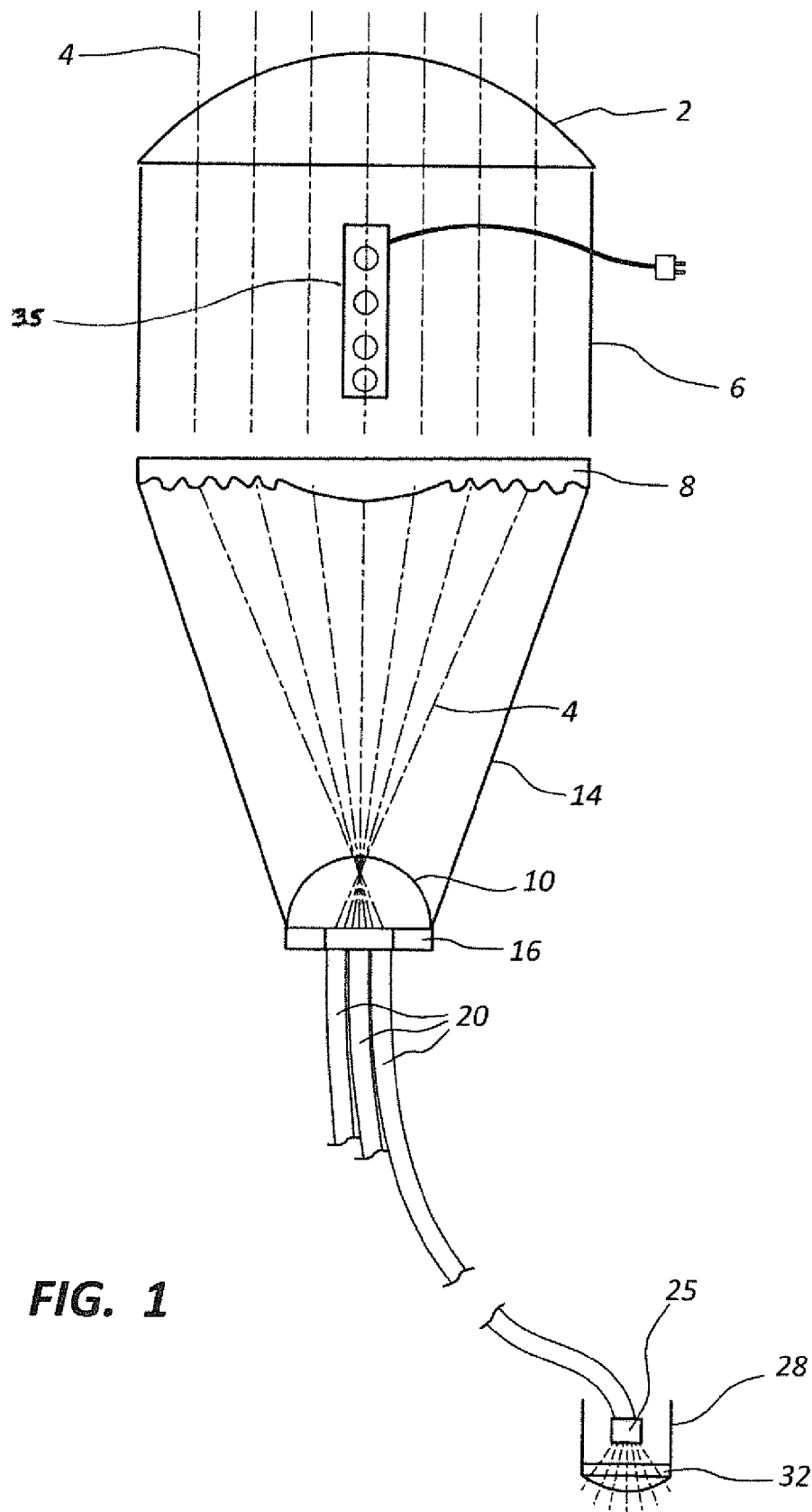
FIG. 1 is a diagrammatic representation of the significant structural elements of the present invention.
Figure 2:
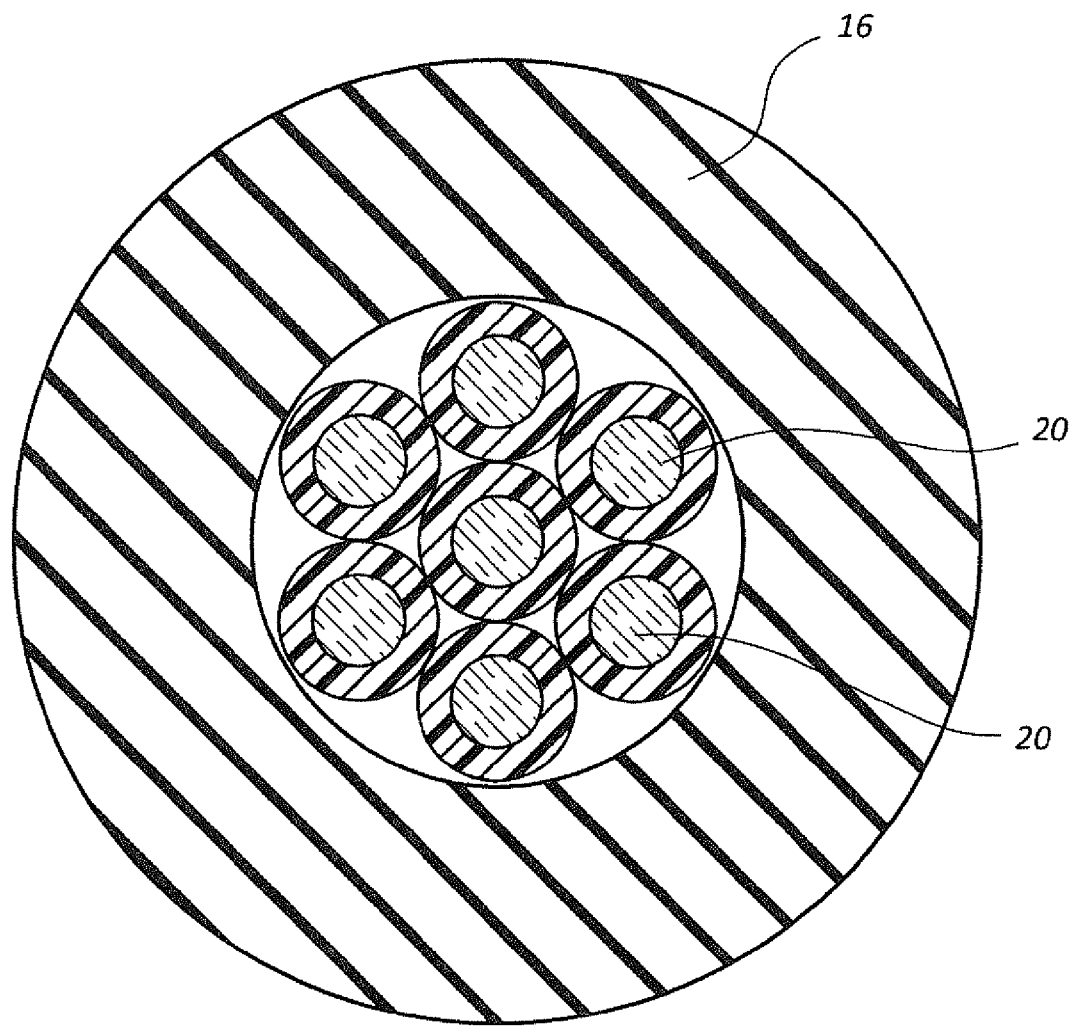
FIG. 2 is a cross sectional view of a typical bundle of fiber optic cables attached to a transparent plate.
Figure 3:
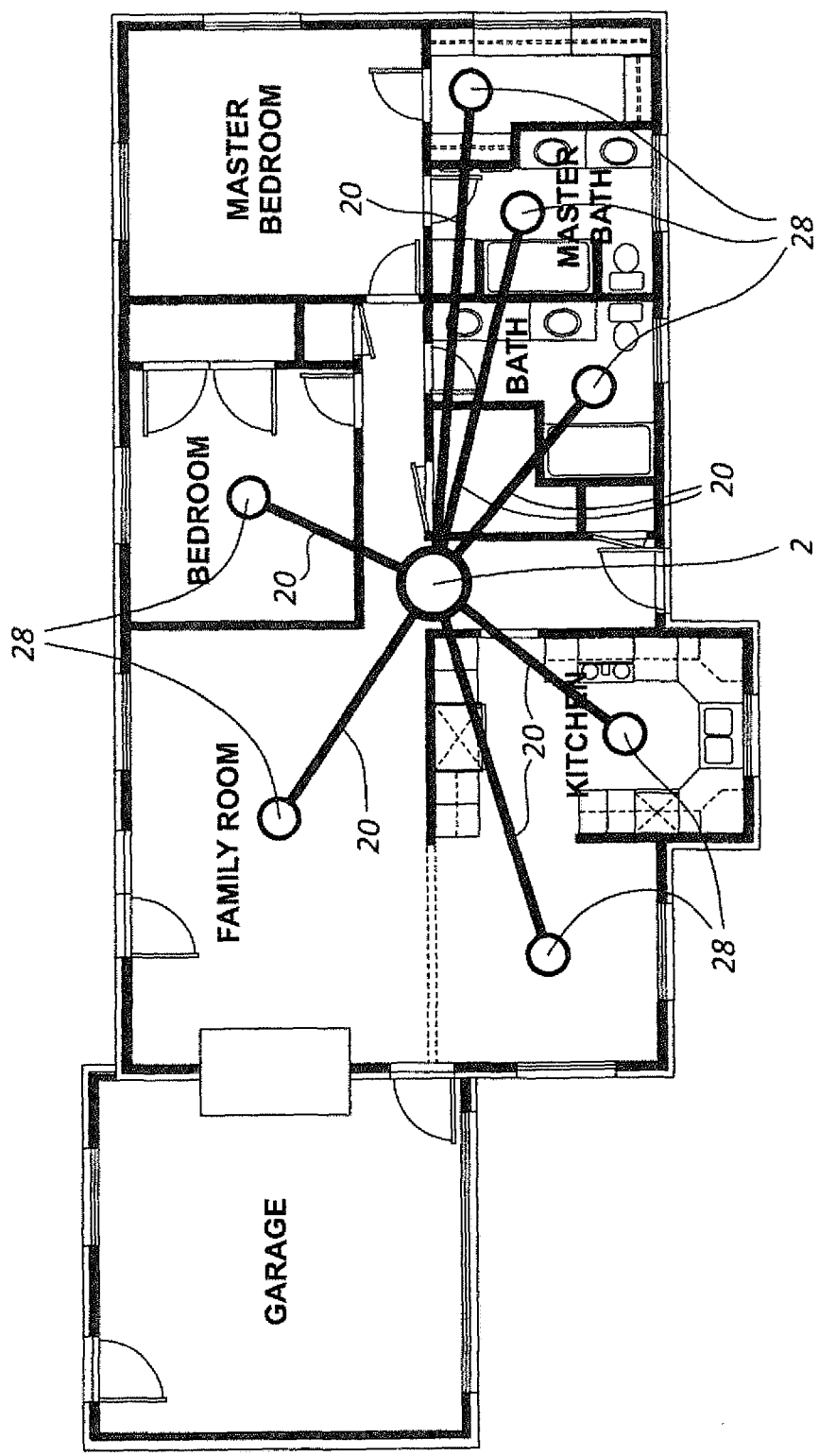
FIG. 3 is a plan view of a typical building illustrating the distribution of light though fiber optic cables interconnecting the sun light collector and a number of room lighting fixtures.
Figure 4A:
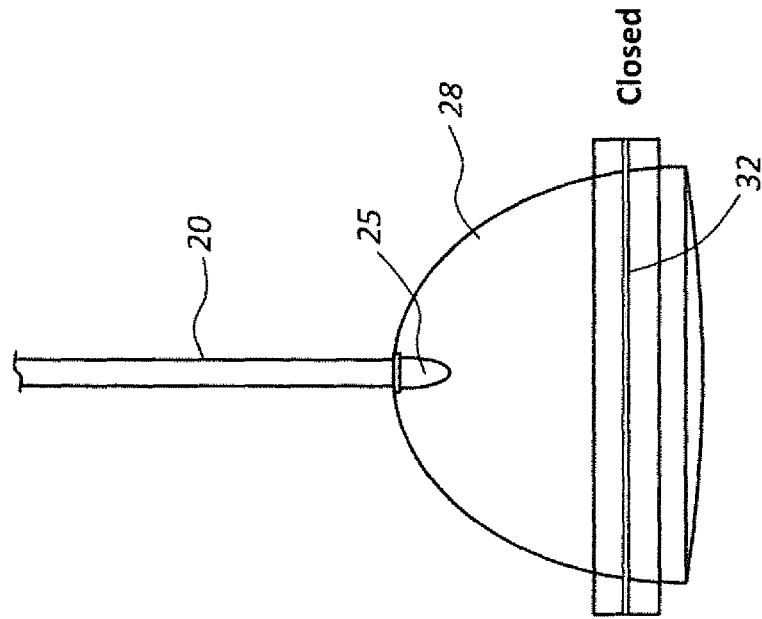
FIG. 4a is a diagrammatic side view of a lighting fixture of the system showing the aperture in the fixture in the open position.
Figure 4B:
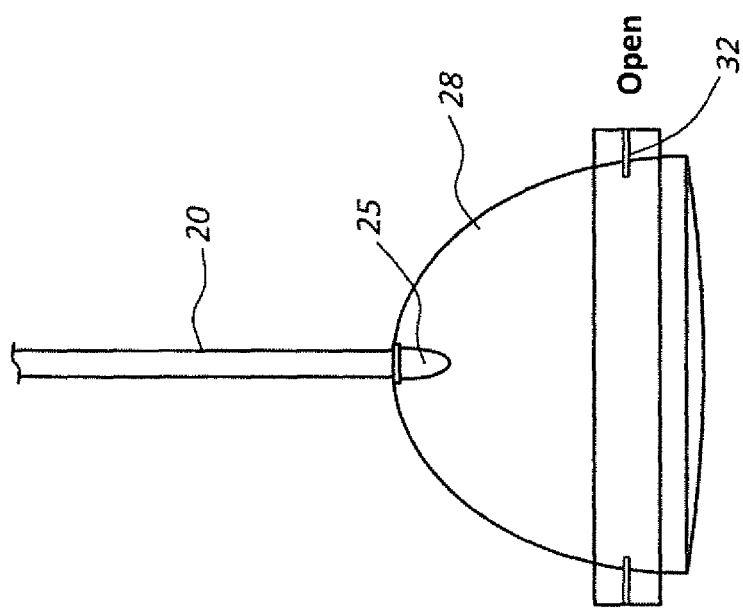
FIG. 4b is a diagrammatic side view of a lighting fixture of the system showing the aperture in the fixture in the closed position.

The solar lighting system of the present invention begins with a roof mounted dome shaped skylight 2. Sunlight rays 4 pass through the skylight and through a cylindrical sun pipe 6 that is attached to and positioned under the skylight. The skylight eliminates the need for tracking the position of the sun.

A nonimaging Fesnel lens 8 is attached to the lower end of the sun pipe for focusing the sun's rays on a Kohler concentrator lens 10 that is disposed in the apex of a funnel 14 that depends from the perimeter of the circular Fesnel lens 8 and is provided with light reflective interior surfaces. The concentration of sunlight that passes through the large Fesnel lens is directed by the Kohler lens onto a glass plate 16 that is attached to the lower flat side of the Kohler lens. Light in the visible spectrum passes through the glass plate and into the receiving end of a plurality of bundled solid core fiber optical cables 20.

Each of the cables 20 is directed to a room or specific location in a building where the distal end of the cable terminates in a light diffuser 25 disposed within a lighting fixture 28, preferably located in the ceiling of the room. The lighting fixture contains an adjustable aperture 32 to control the amount of light coming from the fixture.

Preferably, the lighting system includes an alternate light source to be employed at night, Located within the sun pipe 6 is an array of light emitting diodes 35 whose light output substitutes for the sun during periods of darkness.

I claim:

1. A solar lighting system comprising,
   a cylindrical tube having first and second ends and disposed through the roof structure of a building,
   a translucent dome covering the first end of the cylindrical tube,
   a funnel having a wide circular mouth and an open apex where the perimeter of the wide circular mouth is attached to the second end of the cylindrical tube,
   a fresnel lens having a first surface with a plurality of concentric annular sections disposed in the plane of the perimeter of the wide circular mouth of the funnel where the first surface faces the open apex of the funnel,
   a Kohler concentrator lens disposed in the open apex of the funnel,
   a transparent plate having upper and lower mutually parallel sides, the upper side disposed in contact with the Kohler concentrator lens,
   at least one fiber optic cable having input and output ends where the input end is optically connected to the lower side of the transparent plate.

2. The system of claim 1 and further including,
   an array of light emitting diodes disposed within the cylindrical tube.

3. The system of claim 1 where the interior surfaces of the funnel are light reflective.

4. The system of claim 3 and further including an optical diffuser connected to the output end of the at least one fiber optical cable.

5. The system of claim 4 and further including a lighting fixture having an adjustable light aperture disposed proximate to the optical diffuser for adjusting the amount of diffuser light that passes from the lighting fixture.

* * * * *